Oct. 3, 1961 W. H. DU SHANE ET AL 3,002,397
CONTROL MECHANISM
Filed March 2, 1959 3 Sheets-Sheet 3

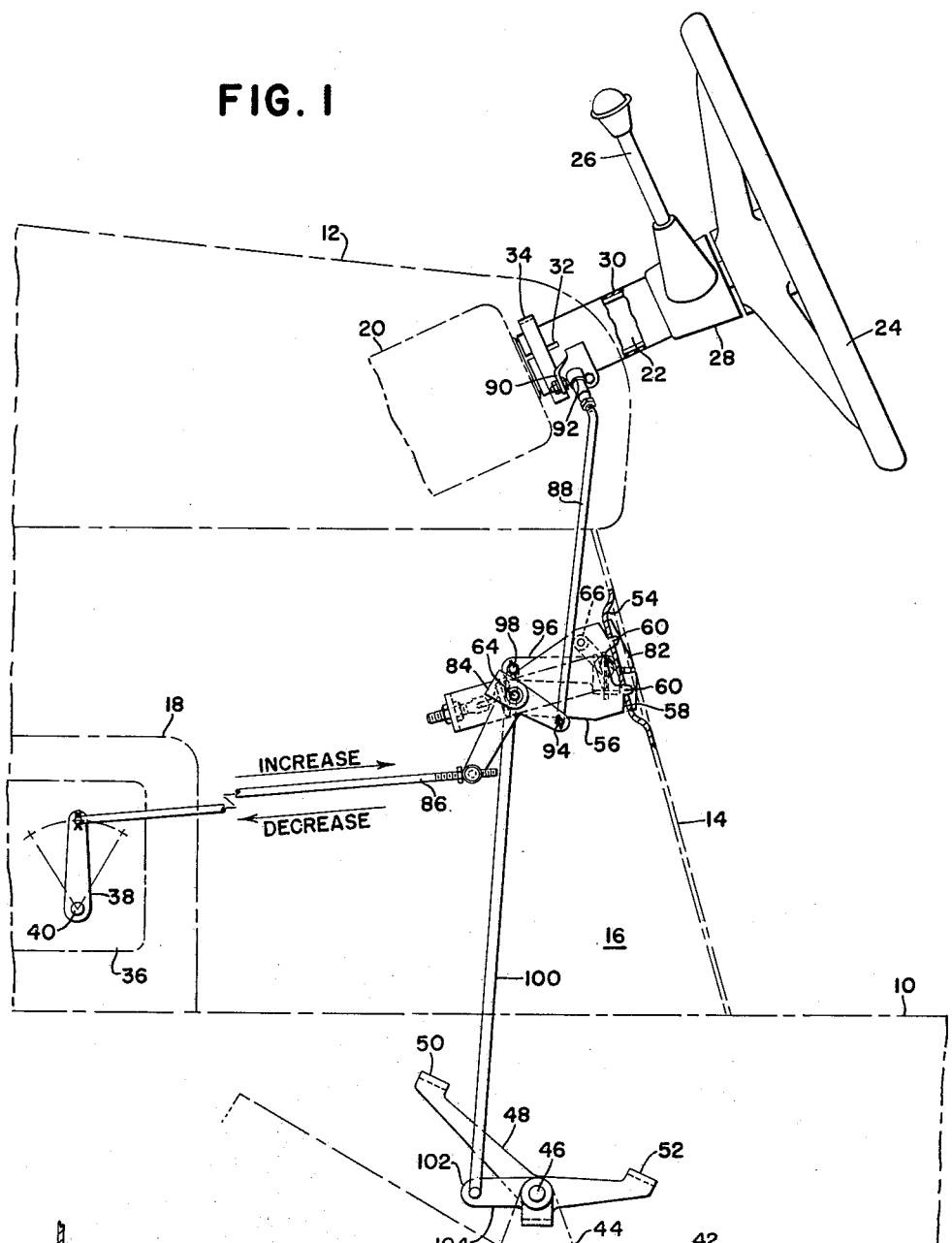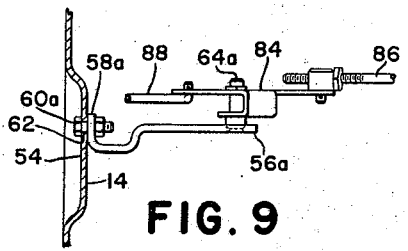

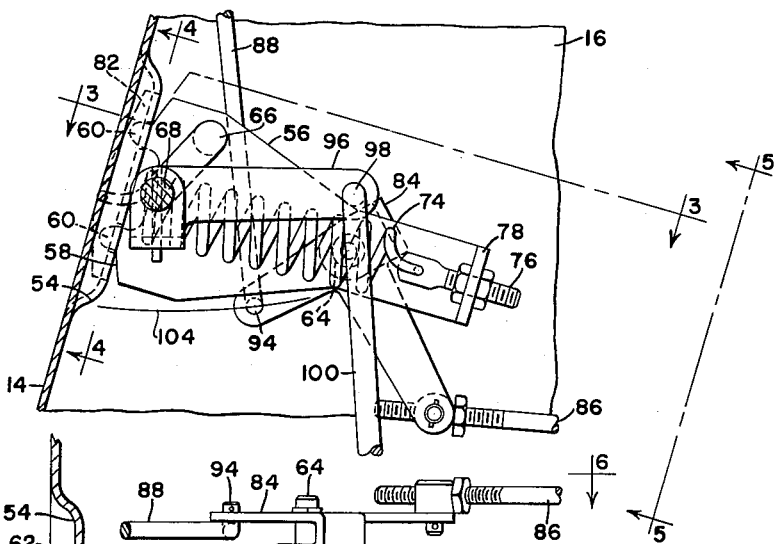
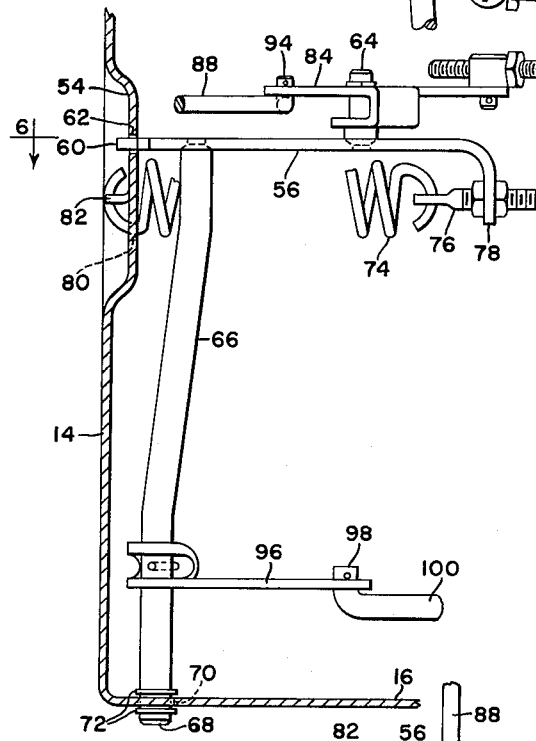
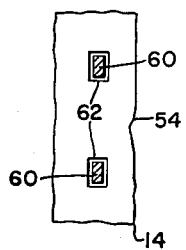
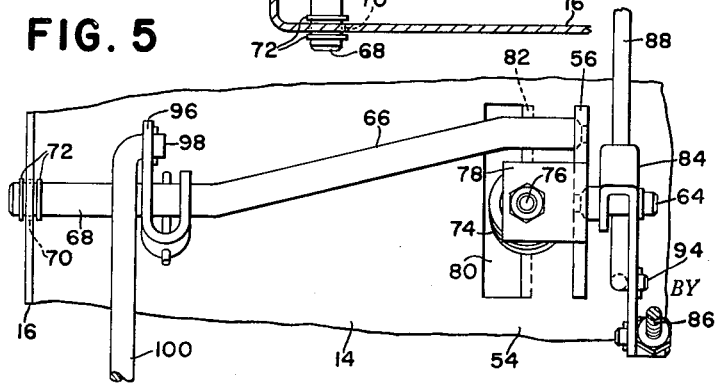

INVENTORS
W. H. DuSHANE
L. R. BEARD

United States Patent Office 3,002,397
Patented Oct. 3, 1961

3,002,397
CONTROL MECHANISM
Wallace H. Du Shane and Lawrence R. Beard, Waterloo, Iowa, assignors to Deere & Company, Moline, Ill., a corporation of Delaware
Filed Mar. 2, 1959, Ser. No. 796,659
13 Claims. (Cl. 74—482)

This invention relates to a control mechanism and more particularly to such control mechanism as applied to the dual control of the internal combustion engine, for example, of a vehicle.

The invention finds its principal utility in the application thereof to an agricultural tractor, which is conventionally controlled by a governor-regulated engine, the settings of which may be changed by a hand lever. Unlike the typical automobile, agricultural tractors have not heretofore been commercially equipped on a wide scale with foot feeds or accelerators, because, in general, the two types of speed regulation (hand lever and foot feed) were thought to be largely mutually exclusive. However, the modern agricultural tractor has become more powerful and its uses more universal, and the combination of the foot accelerator with the hand lever control has demonstrated advantages that are worth exploiting.

It is accordingly one of the principal objects of the present invention to provide a novel and improved combination dual control for an adjustable speed-regulating device such as that used to regulate the speed of a power plant, such as an internal combustion engine as used on vehicles in the tractor class; although, various aspects of the invention will have application to other vehicles and to the control of other types of regulators. It is an object of the invention to provide a coordinated control mechanism in which a selected speed of the regulator may be set by the hand lever and may be varied at will by the accelerator in both directions from the set speed; that is to say, the set speed may be either increased or decreased. In this respect, it is a feature of the invention to provide the design with means whereby both increase and decrease by the foot feed may be accomplished without disturbing the position of the hand lever and in such manner that when the foot feed returns to neutral, the speed selected by the hand lever will be restored. Specifically, it is an object of the invention to provide control linkage having a shiftable fulcrum operative normally in a static position to enable control of the speed regulator by the hand lever but shiftable as to position by the accelerator-decelerator so as to modify the control linkage and to enable restoration of the control linkage to such position as to restore the original setting by the hand lever. The invention features a shiftable fulcrum in the form of a member of sprocket-like construction cooperative with a track and shiftable selectively to opposite sides of an intermediate position so as to enable both increase and decrease in the speed selected by the hand lever. The invention has for other objects the provision of the shiftable fulcrum means, improved means for changing the position of the fulcrum means, and a novel design enabling interchangeability between the shiftable fulcrum and a fixed fulcrum in the event that the dual control is not desired.

The foregoing and other important objects and desirable features inherent in and encompassed by the invention will become apparent as a preferred embodiment thereof is disclosed, by way of example, in the ensuing description and accompanying sheets of drawings, the several figures of which are described below.

FIG. 1 is a fragmentary side view, partly in phantom and partly in section, illustrating the overall organization of the control mechanism.

FIG. 2 is a fragmentary side view, on an enlarged scale and partly in section, of an intermediate portion of the control mechanism as seen from the side opposite that shown in FIG. 1.

FIG. 3 is a plan, partly in section as seen along the line 3—3 of FIG. 2, of the control mechanism.

FIG. 4 is a section as seen along the line 4—4 of FIG. 2.

FIG. 5 is a front view as seen along the line 5—5 of FIG. 2.

Figure 6:
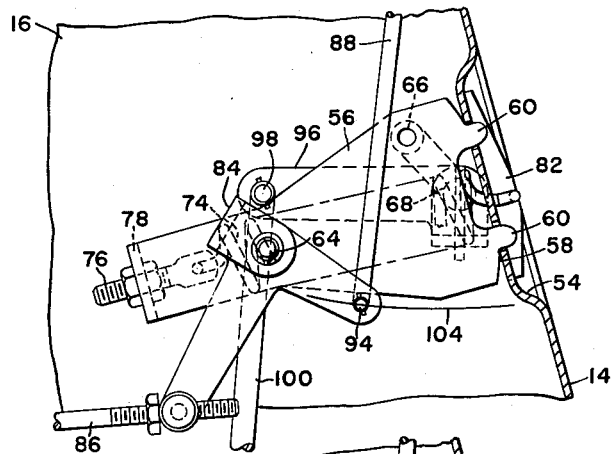
FIG. 6 is a section on the line 6—6 of FIG. 3.

As already suggested, the invention finds ideal application to the control of an internal combustion engine for an agricultural tractor, but, as the description progresses, its application to other circumstances will be apparent. For purposes of the present disclosure, the vehicular environment has been selected and to that end the drawings illustrate only so much of a vehicle as is necessary to an understanding of the invention.

FIG. 1 illustrates at 10 the basic body of a tractor, for example, which includes additional structure, all of which affords a support for the control components to be described. For example the body 10 includes an upper cowl assembly 12 supported on a rear transverse panel 14 having opposite side sheets 16 which enclose the rear part of a power plant, here a typical internal combustion engine designated in its entirety by the numeral 18. Within the supporting structure 12—14—16 is included a housing 20 from which a steering post 22 extends upwardly and rearwardly to carry a steering wheel 24. This much of the structure is indicated somewhat in detail because it is typical of that design in which a hand-operated control is mounted adjacent to the steering wheel for convenience. In the present case, such controller, hereinafter sometimes referred to as a first controller, takes the form of a hand lever 26 secured to and rockable with a collar 28 about the axis of the steering post 22. The collar 28 is in turn fixed to a sleeve 30 having its lower end split at 32 and surrounded by a band 34 by means of which the tube 30 is frictionally related to the stationary steering post 22, thereby affording means whereby the angular position of the tube 30 relative to the post 22 may be releasably retained. In other words, the frictional force exerted by the clamp at 32—34 on the post 22 is sufficient to retain the position of the tube, collar and hand lever 26 except when upset by the application of manual force. Accordingly, the hand lever 26 is selectively adjustable through a relatively wide speed adjustment range and the selected speed may be retained until changed manually. As already indicated, the hand-operated control may be other than that illustrated, because, by itself, it does not in any way limit the scope of the broad combination of the control mechanism and its related components.

For purposes of the present disclosure, the internal combustion engine 18 is referred to as being under the control of a bi-directionally adjustable speed regulator 36, which may be considered representative of any typical engine governor. A control arm 38 is rockably supported by a shaft 40 for swinging in opposite directions. In the present case, movement rearwardly or in a clockwise direction about the axis of the shaft increases engine speed and movement in the forward or opposite direction decreases engine speed. Details not illustrated are assumed to be familiar to those versed in the art and therefore elaboration is dispensed with.

The vehicle body 10 includes a floorboard portion 42 which carries a bracket 44 for rockably supporting at 46 a foot feed element in the form of a pedal 48 having front and rear pedal portions 50 and 52 respectively. The pedal 48 is illustrated in what may be regarded as a neutral position and may be rocked downwardly or in a counterclockwise direction for the purpose of increasing engine speed as will be brought out below. Conversely, the pedal may be rocked rearwardly or in a clockwise direction for decreasing engine speed. Because of its dual function, the pedal is known as an accelerator-decelerator, depression of the pedal via its front pedal portion 50 serving the accelerator function and depression of the pedal by its rear pedal portion 52 serving the decelerator function. Considering the hand lever 26 as a first controller, the accelerator-decelerator 48 may be regarded as a second controller. The manner in which both of these may be used independently to set or control the speed regulator or governor 36 will be described below.

According to the present invention, an intermediate portion of the transverse panel 14 is constructed to form a track 54. In the present case, the track is shaped as an integral part of the panel 14; although, it will be obvious that it may be formed of a separate piece or otherwise, all with equally good results. This track serves as means for supporting a fulcrum means 56, here in the form of a platelike member having an arcuate rear edge portion 58 provided with a pair of tooth elements 60. The track portion 14 of the support has a pair of vertically spaced apertures 62 which respectively receive the teeth 60. Thus, the structure 60—62 affords toothed means cooperative between the support and the member 56. In other words, the member 56 is of sprocket-like construction and may roll, within limits, along the track 54.

The plate or member 56 carries forwardly of the arcuate portion 58 a pin 64 which affords a fulcrum. The arcuate portion 58 is drawn about this fulcrum as a center. In the preferred construction, illustrated, the pin 64 is welded to the plate member 56 and projects laterally therefrom as best seen in FIGS. 3 and 5. A lateral extension, here in the form of a rod 66, is rigidly welded, for example, at one end to the plate 56 at the side thereof opposite to the fulcrum 64, and this rod extends laterally away from the plate 56 to a terminal end 68 which is carried in means affording a bearing in the opposite side sheet 16. In the present case, the bearing is afforded by an aperture 70 which is sufficiently larger in diameter than the terminal end portion 68 of the rod 66 so as to loosely receive this terminal end portion. A pair of snap rings 72 retains the rod against axial displacement. The bearing thus constituted is of a universal nature, enabling rocking of the assembly 56—66 not only about the axis of the terminal end portion 68 but also about the rolling axis of the arcuate edge portion 58. The rolling axis will of course be the axis of the fulcrum pin 64, about which the arcuate edge 58 is formed. The bearing 70—72 is located relatively close to the plane of the track 54 so that displacement of the member 56 from its own plane will not be critical, particularly in the environment disclosed wherein, as in other control linkages of the same general character, the pivotal connections among components are relatively loose so as to allow considerable flexibility of movement without distortion of the parts.

Figure 7:
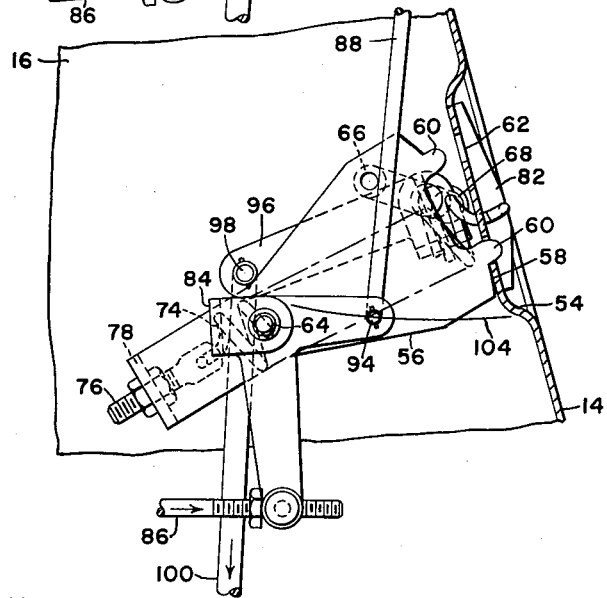
FIG. 7 is similar to FIG. 6 but shows the fulcrum means displaced downwardly or in the direction of speed increase.
Figure 8:
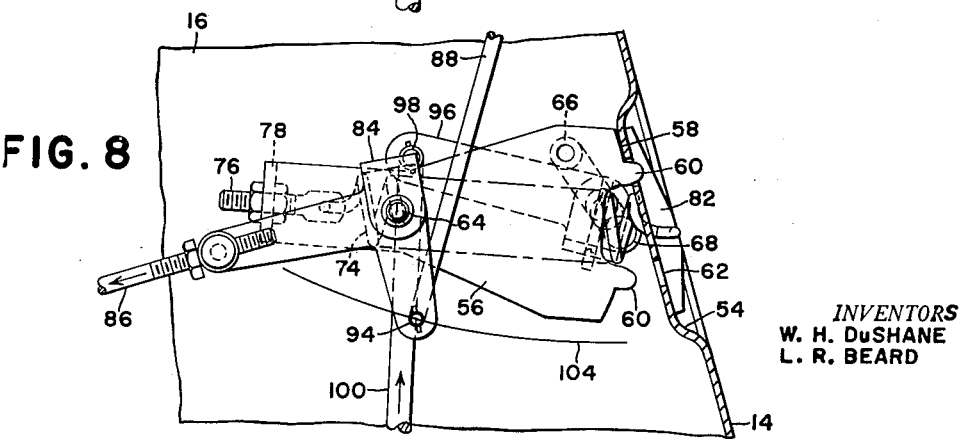
FIG. 8 is a similar view but illustrating the fulcrum means shifted upwardly or in the direction of speed decrease.

As best seen in FIG. 6, the fulcrum means or member 56 is capable of occupying an intermediate or normally static position from which it is selectively displaceable to either side. FIG. 7 shows a downward displacement and FIG. 8 illustrates an upward displacement. In either case (FIGS. 7 or 8) the member 56 rolls along the track 54 and the toothed elements comprising the teeth 60 and meshing apertures 62 prevent angular slippage of the member relative to the track. In view of the rolling or shifting action noted, the fulcrum 64 leaves the intermediate position and departs downwardly in FIG. 7 and upwardly in FIG. 8. Because of the looseness of the bearing at 70—72, this movement is permitted without distortion of the components. For the purpose of maintaining the assembly 56—66 in place, biasing means in the form of a tension spring 74 is connected between the member 56 and the support panel 14. The forward end of the spring 74 is received in an eye-bolt 76 carried by a bent over end 78 of the member 56. The rear end of the spring 74 is hooked over a tab 80 formed, according to the present design, by punching an aperture in the track 54 and bending the incompletely punched portion back to form the tab. Any other form of connection will suffice, it being significant only to note that the line of force exerted by the spring 74 would theoretically coincide with a radius through the axis of the fulcrum 64 and bisecting the angular space between the two teeth 60, but in practice the location is such that the teeth have approximately the same load when all external forces are considered, such as weights of parts connected to the arm 56, etc. Thus, the spring 74 serves not only to maintain the intermediate or normally static position of the member 56 but also, in combination with the bearing means 70—72, retains the assembly 56—66 in place, and thus functions as biasing means maintaining the intermediate position of FIG. 6 but enabling movement of the member out of that position to either side thereof. Also, the biasing means is capable of recovering the position of FIG. 6 when the displacing force is removed.

The basic part of the control linkage as affected by the hand lever 26 comprises a control element or lever means 84 rockably carried on the fulcrum 64 and here in the form of a bell crank, the lower arm of which is connected by a link 86 to the regulator or governor arm 38, and the rearward arm of which is connected by force-transmitting or link means 88 to an arm 90 rigidly secured to the hand lever tube 30. The connection between the link 88 and arm 90 is preferably of the ball or universal type, as designated here generally by the numeral 92, and the connection between the link and the associated arm of the bell crank 84 is pivotal on an axis parallel to the axis of the fulcrum 64. This pivotal connection is indicated by the numeral 94. It will thus be seen that with the member 56 in its intermediate or normally static position, as retained by the spring 74, the fulcrum 64 is fixed, and the bell crank 84 may be rocked about the fulcrum via the hand lever 26 and link 88 to act through the link 86 to change the angular position of the governor arm 38. When the hand lever is moved upwardly or in a clockwise direction as viewed by a person sitting behind the steering wheel 24, the links 88 and 86 operate in tension and in a speed-increasing direction, as indicated by the legend in FIG. 1. Conversely, when the lever 26 is moved downwardly, the links 86 and 88 operate in compression or in a speed-decreasing direction, as also indicated by the legend in FIG. 1. To this extent, the structure may be regarded as typical of any single-control mechanism featuring a hand lever control for a governor or comparable regulator. As a matter of fact, the shiftable fulcrum means 56 may be replaced or interchanged with a fixed fulcrum support as suggested in FIG. 9, wherein a bracket 56a is shown as used in place of the fulcrum means 56, this bracket having a fulcrum pin 64a for mounting the bell crank 84. In this case, however, the holes 62 in the track portion 54 of the panel 14 are utilized to receive cap screws 60a which pass through an integral apertured portion 58a of the fixed support bracket 56a. This is illustrative of that feature of the invention which enables the type of interchangeability noted. However, of greater significance is the utility of the shiftable fulcrum 56 in enabling control of the regulator 36 via the accelerator-decelerator 48 irrespective of the setting imposed on the governor by the hand lever 26.

The rod or extension 66 has rigidly secured thereto adjacent its terminal end 68a forwardly extending arm 96 to which is pivotally connected at 98 the upper end of a force-transmitting or link means 100, the lower end of which is pivotally connected at 102 to an arm 104 rigid with the accelerator-decelerator 48.

The operation of the mechanism involves the dual albeit independent control of speed regulation by either of the controllers 26 or 48. When the fulcrum means 56 is maintained normally in its static or intermediate position (FIGS. 1, 2 and 6) the fulcrum 64 is in effect stationary and the bell crank 84 may be rocked therebout by the hand lever 26 to establish any desired setting for the governor or regulator 36. Because of the friction means at 32—34 between the hand lever collar 30 and steering post 22, whatever position is selected by the hand lever 26 will be retained until deliberately disturbed.

Let it be assumed that the intermediate position of the governor arm 38 has been selected, as shown in FIG. 1. As already indicated, this position will be retained because of the friction means 32—34. Now, if the operator desires to increase the speed of the vehicle without disturbing the position of the hand lever 26, he merely steps downwardly on the pedal 48 via the front pedal portion 50, which exerts a downward force through the link 100 on the arm 96 on the extension rod 66. This will apply a twisting moment to the rod which, being rigidly secured to the member 56, will cause the member 56 to shift to the position of FIG. 7. The arrow on the link 100 in that figure designates the downward pull on the link. Since the fulcrum 64 is displaced downwardly from its position of FIG. 6, and since the pivotal connection 94 cannot move directly downwardly, because of the retention of the upper end of the link by the friction means 32—34, the bell crank 84 will tend to pivot in a counterclockwise direction, the link 88 swinging rearwardly about the ball connection 92 in the arc 104 shown in FIG. 7. Since the bell crank 84 swings as aforesaid, it will exert a rearward force on the link 86 to the governor arm 38, as indicated by the rearwardly directed arrow in FIG. 7. This pull is in the speed-increasing direction and consequently the speed of the engine will increase. Depression of the pedal 48 in the manner described shifts the member 56 against the retaining and recovering action of the spring 74 so that, when manual pressure is relieved from the pedal 48, the spring 74 will restore the original pre-selected position of the member 56 as shown in FIG. 6, whereby the status of the control linkage will also be restored, which of course includes restoration of the original setting of the governor arm 38. Again, the link 88 swings forwardly about the arc 104 as the fulcrum 64 returns upwardly to its previous position.

The invention has the additional feature that the preselected speed may be decreased, and this is accomplished by depression of the pedal 48 via its rearward pedal portion 52, whereby the link 100 acts in compression against the arm 96 on the rod 66 so as to cause the member 56 to shift upwardly, carrying its fulcrum 64 upwardly from the intermediate position of FIG. 6 to the upwardly displaced position of FIG. 8. Again, the link 88, being pivoted at the point 92 on the hand lever control arm 90, swings forwardly about the arc 104 as the bell crank 84 swings in a clockwise direction, exerting a forward force on the governor arm link 86 as indicated by the forwardly directed arrow in FIG. 8. This, of course, decreases the effect of the governor on the engine and engine speed is decreased. As before, release of the pedal 48 for return to its neutral position involves restoration of the linkage to its status of FIGS. 1 and 6. No independent biasing means need be used for the pedal 48, since it is subject to the influence of the biasing means established by the spring 74 acting on the member 56.

The specific structure illustrated, at least as respects the means whereby the member 56 is rocked or shifted by the pedal 48, is peculiar to a design that accommodates space limitations and other characteristics. For example, the rod 66 may be shaped other than as shown. Likewise, a connection could be made directly to the member 56 at any point thereon and the broad features of the invention would be accomplished.

The basic design of the invention is simple in proportion to its capacity. The multi-functions of the spring 74 are of significance, since it serves not only to maintain the position of the member 56 as shown in FIG. 6, but also serves as a basic part of the means whereby the member 56 is mounted on the track 54 of the support panel 14 and further serves as means for restoring the neutral position of the pedal 48.

Features and advantages in addition to those enumerated will readily occur to those versed in the art, as will various modifications and alterations in the preferred embodiment disclosed, all of which may be achieved without departure from the spirit and scope of the invention.

What is claimed is:

1. Control mechanism for a bidirectionally adjustable regulator means, comprising: a support; a shiftable member carried by the support for movement selectively to either side of an intermediate position; biasing means operative on said member to yieldably retain and recover its intermediate position; a control element connected to and for adjusting the regulator means; means mounting said element on the member for movement selectively in either direction relative to the member in its intermediate position for adjusting the regulator means, and said mounting means carrying the element on the member to move with the member when said member is shifted to either side of its intermediate position; means connected to and for shifting the member to either side of its intermediate position; a controller adjustable on the support selectively in opposite directions through an adjusting range; means operative on the controller to releasably retain said controller in any selected position of adjustment; and force-transmitting means having a first connection to the controller and a second connection to the element for positioning said element relative to the member while in its intermediate position, said connections being so arranged relative to the mounting means for the element that shifting of the member to either side of its intermediate position carries the element with the member and causes said element to react against the selectively positioned controller so that the element causes adjustment of the regulator means independently of the controller, and said biasing means operating via return of the member to its intermediate position to return the element to the position thereof selected by the controller.

2. Control mechanism for a bidirectionally adjustable regulator means, comprising: a support; lever means connected to and for adjusting the regulator means; fulcrum means mounting the lever means; means mounting the fulcrum means on the support for shifting of the fulcrum means selectively to either side of an intermediate position; biasing means acting on the fulcrum means to yieldably retain and recover said intermediate position; a first controller mounted on the support for adjustment selectively in opposite directions through an adjusting range; force-transmitting means having a first pivotal connection to the controller and a second pivotal connection to the lever means in spaced relation to the fulcrum means for causing rocking of the lever means about the fulcrum means in its intermediate position in response to adjustment of the controller; means operative on the controller to releasably retain any selected adjusted position thereof and thus to incur a corresponding set position of the lever means; and a second controller movable on the support to either side of a neutral position and connected to the fulcrum means for shifting the fulcrum means to either side of its intermediate position to cause the lever means to rock about its pivotal connection to the selectively positioned first controller whereby to adjust the regulator means independently of said first controller.

3. Control mechanism for a bidirectionally adjustable regulator means, comprising: a support; lever means connected to and for adjusting the regulator means; a member having an arcuate edge portion and further having thereon and movable therewith a fulcrum pivotally carrying said lever means and located on an axis substantially coincident with the center about which said arcuate edge portion is formed; a track on the support and engaged by said arcuate edge portion whereby said member may roll selectively in its intermediate position in opposite directions to displace the fulcrum selectively to either side of an intermediate position; biasing means acting on the member to yieldably retain and recover said intermediate position; a first controller mounted on the support for adjustment selectively in opposite directions through an adjusting range; force-transmitting means having a first pivotal connection to the controller and a second pivotal connection to the lever means in spaced relation to the fulcrum for causing rocking of the lever means about the fulcrum in response to adjustment of the controller; means operative on the controller to releasably retain any selected adjusted position thereof and thus to incur a corresponding set position of the lever means; and a second controller movable on the support to either side of a neutral position and connected to the member for rocking said member to displace the fulcrum to either side of its intermediate position to cause the lever means to rock about its pivotal connection to the selectively positioned first controller whereby to adjust the regulator means independently of said first controller.

4. The invention described in claim 3, including: toothed means cooperative between said arcuate edge portion and the track to prevent angular slippage of the member.

5. The invention described in claim 4, in which: the toothed means includes a pair of tooth elements spaced apart relatively widely along said arcuate edge portion; and the biasing means comprises a spring connected between the rockable member and the support and exerting a tensional force along a line passing through the fulcrum axis and midway between said pair of tooth elements and thereby yieldably retaining said intermediate position of said member and fulcrum.

6. Control mechanism for an adjustable device, comprising: a support having a track portion thereon; a member having an arcuate portion engaging and rollable along said track portion to enable movement of the member out of and back to a normal position; biasing means operative to yieldably retain said member in and to return said member to said normal position; a fulcrum on and movable with the member and located on an axis substantially coincident with the center about which said arcuate edge portion is formed; lever means connected to said device and mounted on said fulcrum to rock relative to the member in its normal position for adjusting said device; a first controller selectively adjustable on the support and releasably settable in any selected adjusted position; force-transmitting means connected to the first controller and connected to the lever means at a pivot in radially spaced relation to the fulcrum axis for rocking the lever means about said fulcrum relative to the member in its normal position and thereby to select a setting of the lever means in accordance with the setting of said first controller; and a second controller movable on the support out of and back to a starting position and connected to the member to roll said member out of its normal position and to thereby cause the lever means to pivot about the aforesaid pivot so as to adjust the device while the first controller retains its selected adjusted position, said biasing means acting to restore the normal position of the rockable member and the setting of the lever means upon return of the second controller to its starting position.

7. Control mechanism for an adjustable device, comprising: a support having a track portion thereon; a member having a portion engaging and movable along said track portion to enable movement of the member out of and back to a normal position; biasing means operative to yieldably retain said member in and to return said member to said normal position; a fulcrum on and movable with the member; lever means connected to said device and mounted on said fulcrum to rock relative to the member in its normal position for adjusting said device; a first controller selectively adjustable on the support and releasably settable in any selected adjusted position; force-transmitting means connected to the first controller and connected to the lever means at a pivot in radially spaced relation to the fulcrum for rocking the lever means about said fulcrum relative to the member in its normal position and thereby to select a setting of the lever means in accordance with the setting of said first controller; and a second controller movable on the support out of and back to a starting position and connected to the member to move said member out of its normal position and to thereby cause the lever means to pivot about the aforesaid pivot so as to adjust the device while the first controller retains its selected adjusted position, said biasing means acting to restore the normal position of the rockable member and the setting of the lever means upon return of the second controller to its starting position.

8. Control mechanism for a bidirectionally adjustable regulator means, comprising: a support; lever means connected to and for adjusting the regulator means; a shiftable member having thereon and movable therewith a fulcrum pivotally mounting the lever means; a track on the support and engaged by and guiding said member for movement selectively in opposite directions to displace the fulcrum selectively to either side of an intermediate position; biasing means acting on the member to yieldably retain and recover said intermediate position; a first controller mounted on the support for adjustment selectively in opposite directions through an adjusting range; force-transmitting means having a first pivotal connection to the controller and a second pivotal connection to the lever means in spaced relation to the fulcrum for causing rocking of the lever means about the fulcrum in its intermediate position in response to adjustment of the controller; means operative on the controller to releasably retain any selected adjusted position thereof and thus to incur a corresponding set position of the lever means; and a second controller movable on the support to either side of a neutral position and connected to the rockable member for rocking said member to displace the fulcrum to either side of its intermediate position to cause the lever means to rock about its pivotal connection to the selectively positioned first controller whereby to adjust the regulator means independently of of said first controller.

9. Control mechanism for a bi-directionally adjustable device, comprising: a support having a track portion thereon; a rockable member having an arcuate edge portion engaging and rollable along said track portion selectively to either side of an intermediate position; a fulcrum on and movable with the member and located on an axis substantially coincident with the center about which said arcuate edge portion is formed; a lateral extension rigidly secured to the member and extending therefrom to a terminal end portion axially spaced from the member as measured along said axis and relatively close to the plane of the track portion; bearing means on the support and loosely mounting said terminal end portion to enable rolling of the member as aforesaid; spring means acting between the member and the support to draw the two together radially of said axis, said spring means, track portion and edge portion of the member being so related that the spring means yieldably retains said member in its intermediate position; lever means rockable on the fulcrum and connected to the adjustable device; a first controlled on the support and mounted for movement through an adjusting range; means acting on the controller to releasably retain any selected adjusted position of said controller in said range; link means having pivotal connections at opposite ends to the controller and to the lever means, said connection to the lever means being spaced radially from the fulcrum so that adjustment and selective positioning of the first controller incurs rocking and selective positioning of the lever means; a second controlled on the support movable selectively in opposite directions from a neutral position; and force-transmitting means connecting the second controlled to the aforesaid extension to apply a twisting movement to said extension in response to movement of said second controller out of its neutral position and thereby to incur rocking of the member and pivoting of the lever means about its pivotal connection to the link means so as to adjust the device while the first controller retains its selected adjusted position.

10. The invention described in claim 9, including: toothed means cooperative between the edge portion of the member and the track portion to prevent angular slippage of the member relative to the track portion.

11. The invention described in claim 10, in which: the toothed means comprises a pair of apertures in the track portion and a pair of teeth on the arcuate edge portion of the member and meshing respectively with said apertures, and the line of force exerted by the spring means when the member is in its intermediate position is a radius of the fulcrum axis centered between said pair of teeth.

12. The invention described in claim 10, in which: the toothed means comprises a pair of tooth elements spaced angularly of the arcuate edge portion of the member, and the line of force exerted by the spring means when the member is in its intermediate position is a radius of said axis centered between said pair of toothed elements.

13. Control mechanism for an adjustable device, comprising: a support having a track portion thereon; a rockable member having an arcuate edge portion engaging the track portion whereby said member is rollable along said track portion selectively out of and back to a normal position; a fulcrum on and movable with the member and located on an axis substantially coincident with the center about which said arcuate edge portion is formed; a lateral extension rigidly secured to the member and extending therefrom to a terminal end portion axially spaced from the member as measured along said axis and relatively close to the plane of the track portion; bearing means on the support and loosely mounting said terminal end portion to enable rolling of the member as aforesaid; spring means acting between the member and the support to draw the two together radially of said axis, said spring means, track portion and edge portion of the member being so related that the spring means yealdably retains said member in its normal position; lever means rockable on the fulcrum and connected to the adjustable device; a first controller on the support and mounted for movement through an adjusting range; means acting on the controller to releasably retain any selected adjusted position of said controller in said range; link means having pivotal connections at opposite ends to the controller and to the lever means, said connection to the lever means being spaced raidally from the fulcrum so that adjustment and selective positioning of the first controller incurs rocking and selective positioning of the lever means; a second controller on the support movable selectively from and back to a neutral position; and force-transmitting means connecting the second controller to the aforesaid extension to apply a twisting moment to said extension in response to movement of said second controller out of its neutral position and thereby to incur rocking of the member and pivoting of the lever means about its pivotal connection to the link means so as to adjust the device while the first controller retains its selected adjusted position.

References Cited in the file of this patent

UNITED STATES PATENTS

| | | |
|---|---|---|
| 757,311 | Jenness | Apr. 12, 1904 |
| 1,029,685 | Huff | June 18, 1912 |
| 1,542,052 | Gillet | June 16, 1925 |
| 1,657,738 | Booth | Jan. 31, 1928 |
| 1,895,650 | Carmean et al. | Jan. 31, 1933 |
| 2,483,224 | Narcovich | Sept. 27, 1949 |
| 2,622,575 | Stump | Dec. 23, 1952 |
| 2,821,091 | Benner | Jan. 28, 1958 |
| 2,876,877 | Selyem | Mar. 10, 1959 |

FOREIGN PATENTS

| | | |
|---|---|---|
| 409,087 | France | Feb. 9, 1910 |
| 666,367 | Great Britain | Nov. 11, 1950 |